US011616260B2

(12) United States Patent
Choi et al.

(10) Patent No.: US 11,616,260 B2
(45) Date of Patent: Mar. 28, 2023

(54) CARTRIDGE FOR BATTERY CELL AND BATTEY MODULE INCLUDING THE SAME

(71) Applicant: LG CHEM, LTD., Seoul (KR)

(72) Inventors: Yong-Joon Choi, Daejeon (KR);
Hwa-Joong Kim, Daejeon (KR);
Jun-Yeob Seong, Daejeon (KR);
Sung-Chun Yu, Daejeon (KR)

(73) Assignee: LG ENERGY SOLUTION, LTD.,
Seoul (KR)

( * ) Notice: Subject to any disclaimer, the term of this patent is extended or adjusted under 35 U.S.C. 154(b) by 170 days.

(21) Appl. No.: 16/345,327

(22) PCT Filed: Jul. 5, 2018

(86) PCT No.: PCT/KR2018/007667
§ 371 (c)(1),
(2) Date: Apr. 26, 2019

(87) PCT Pub. No.: WO2019/027150
PCT Pub. Date: Feb. 7, 2019

(65) Prior Publication Data
US 2019/0312319 A1    Oct. 10, 2019

(30) Foreign Application Priority Data

Jul. 31, 2017    (KR) .......................... 10-2017-0096868

(51) Int. Cl.
H01M 10/04        (2006.01)
H01M 10/613       (2014.01)
(Continued)

(52) U.S. Cl.
CPC ....... H01M 10/613 (2015.04); H01M 10/625 (2015.04); H01M 10/6554 (2015.04);
(Continued)

(58) Field of Classification Search
CPC ............... H01M 10/613; H01M 50/20; H01M 10/6557; H01M 10/625; H01M 10/6554;
(Continued)

(56) References Cited

U.S. PATENT DOCUMENTS 5,558,952 A * 9/1996 Knauer ............... H01M 50/417
429/143
2003/0129486 A1* 7/2003 Bohnstedt ........... H01M 50/466
428/167

(Continued)

FOREIGN PATENT DOCUMENTS

DE    10 2015 206 248 A1    10/2015
EP    2 551 936 A2    1/2013
(Continued)

OTHER PUBLICATIONS

International Search Report (PCT/ISA/210) issued in PCT/KR2018/007667, dated Oct. 23, 2018.

(Continued)

Primary Examiner — Christian Roldan
(74) Attorney, Agent, or Firm — Birch, Stewart, Kolasch & Birch, LLP

(57) ABSTRACT

Disclosed is a cartridge for battery cells, which includes: an upper cooling plate and a lower cooling plate having a plate shape and spaced to face each other, a cooling channel is formed between the upper cooling plate and the lower cooling plate; a main frame surrounding an outer circumference of the upper cooling plate and an outer circumference of the lower cooling plate with battery cells placed on an upper portion and a lower portion of the main frame; and a support portion disposed at the cooling channel and having at least one support rib protruding in at least one of an upper (Continued)

direction and a lower direction, the at least one support rib supporting the upper cooling plate and the lower cooling plate.

10 Claims, 13 Drawing Sheets

(51) Int. Cl.
  *H01M 10/625* (2014.01)
  *H01M 10/6554* (2014.01)
  *H01M 10/6556* (2014.01)
  *H01M 10/6557* (2014.01)
  *H01M 50/20* (2021.01)

(52) U.S. Cl.
  CPC ... *H01M 10/6556* (2015.04); *H01M 10/6557* (2015.04); *H01M 50/20* (2021.01); *H01M 2220/20* (2013.01)

(58) Field of Classification Search
  CPC ......... H01M 10/6556; H01M 2220/20; H01M 10/617; H01M 50/30; H01M 10/0481; H01M 50/209; H01M 10/647; H01M 10/6566; H01M 10/652; H01M 10/6555; Y02E 60/10
  USPC .......................................... 429/120
  See application file for complete search history.

(56) References Cited

U.S. PATENT DOCUMENTS

| | | | |
|---|---|---|---|
| 2009/0186265 A1 | 7/2009 | Koetting et al. | |
| 2011/0189525 A1 | 8/2011 | Palanchon et al. | |
| 2011/0256446 A1 | 10/2011 | Bronczyk et al. | |
| 2011/0293982 A1 | 12/2011 | Martz et al. | |
| 2012/0021270 A1 | 1/2012 | Kumar | |
| 2012/0177952 A1* | 7/2012 | Maguire | H01M 50/20 429/1 |
| 2012/0177979 A1* | 7/2012 | Jin | H01M 50/209 429/159 |
| 2012/0263984 A1 | 10/2012 | Krammer | |
| 2014/0220410 A1* | 8/2014 | Maguire | H01M 10/6557 429/142 |
| 2014/0295227 A1 | 10/2014 | Aoki | |
| 2015/0079444 A1 | 3/2015 | Baumgartner et al. | |
| 2016/0204398 A1* | 7/2016 | Moon | H01M 10/6551 429/120 |
| 2016/0254504 A1* | 9/2016 | Kim | H01M 10/647 429/99 |

FOREIGN PATENT DOCUMENTS

| | | |
|---|---|---|
| JP | 2009-16285 A | 1/2009 |
| JP | 2011-510449 A | 3/2011 |
| JP | 2012-146657 A | 8/2012 |
| JP | 2013-515343 A | 5/2013 |
| JP | 2016-115481 A | 6/2016 |
| JP | 2016-186887 A | 10/2016 |
| KR | 10-0675633 B1 | 2/2007 |
| KR | 10-0684861 B1 | 2/2007 |
| KR | 10-2011-0116529 A | 10/2011 |
| KR | 10-2014-0058759 A | 5/2014 |
| KR | 10-2015-0025241 A | 3/2015 |
| KR | 10-2015-0025308 A | 3/2015 |
| KR | 10-2016-0045462 A | 4/2016 |
| KR | 10-2016-0050843 A | 5/2016 |
| KR | 10-2016-0061122 A | 5/2016 |
| KR | 10-2016-0075068 A | 6/2016 |
| KR | 10-1658594 B1 | 9/2016 |
| KR | 10-2016-0132596 A | 11/2016 |
| WO | WO 2013/038520 A1 | 3/2013 |
| WO | WO 2013/073046 A1 | 5/2013 |

OTHER PUBLICATIONS

European Search Report for Appl. No. 18840490.9 dated Feb. 13, 2020.
European Office Action for European Application No. 18 840 430.9, dated Oct. 6, 2022.

\* cited by examiner

CARTRIDGE FOR BATTERY CELL AND BATTEY MODULE INCLUDING THE SAME

TECHNICAL FIELD

The present disclosure relates to a battery, and more particularly, to a cartridge for a battery cell, which is used when configuring a battery module having a plurality of battery cells, and a battery module including the cartridge.

The present application claims priority to Korean Patent Application No. 10-2017-0096868 filed on Jul. 31, 2017 in the Republic of Korea, the disclosures of which are incorporated herein by reference.

BACKGROUND ART

A battery cell commercially available at the present includes nickel-cadmium batteries, nickel hydrogen batteries, nickel-zinc batteries, lithium battery cells and the like. Among them, the lithium battery cell is in the limelight since it has almost no memory effect compared to nickel-based battery cells and also has very low self-discharging rate and high energy density.

The lithium battery cell uses lithium-based oxide and carbonaceous material as a positive electrode active material and a negative electrode active material, respectively. The lithium battery cell includes an electrode assembly in which a positive electrode plate and a negative electrode plate respectively coated with a positive electrode active material and a negative electrode active material are disposed with a separator being interposed therebetween, and an exterior, namely a battery case, in which the electrode assembly is accommodated and sealed together with an electrolyte.

Generally, a lithium battery cell may be classified into a can-type battery cell in which an electrode assembly is included in a metal can and a pouch-type battery cell in which an electrode assembly is included in a pouch made of aluminum laminate sheets, depending on the shape of an exterior.

In recent years, battery cells have been widely used not only in small-sized devices such as portable electronic devices but also in medium-sized and large-sized devices such as vehicles and power storage devices. When being used in medium-sized and large-sized devices, a large number of battery cells are electrically connected to increase capacity and power. In particular, pouch-type battery cells are widely used for the medium-sized and large-sized devices since they are easy to be stacked.

However, the pouch-type battery cell is generally packaged in a battery case made of a laminate sheet of aluminum and polymer resin, so that the mechanical stiffness is not large. Thus, when constructing a battery module including a plurality of pouch-type battery cells, a frame is often used to protect the battery cells from external impact, prevent the movement thereof, and allow the battery cells to be easily stacked.

The frame may be replaced by a variety of other terms, such as a cartridge, and often has a square plate form with an empty center portion. At this time, four sides of the frame are configured to surround the outer circumference of the pouch-type battery cell. In addition, a plurality of frames are stacked to configure a battery module, and a battery cell may be located in an empty space formed when the frames are stacked.

Meanwhile, when a plurality of battery cells are assembled by using the plurality of frames, a cooling fin having a plate shape may be interposed between the battery cells. The battery cell may be used in a high temperature environment such as in summer, and the battery cell may also generate heat from itself. At this time, if the plurality of battery cells are stacked on one another, the temperature of the battery cell may be further increased. If the temperature of the battery cell is higher than a proper temperature, the performance of the battery cell may deteriorate and there is a risk of explosion or ignition. Thus, when constructing a battery module, a cooling pin is frequently interposed between the battery cells to prevent a temperature rise of the battery cells by means of the cooling pin.

In the battery module where a cooling fin having a plate shape, namely a cooling plate, is interposed between the battery cells, the battery cells may be cooled in various forms and methods. Among the cooling methods, air cooling type which lowers the temperature of the battery cells through heat exchange between the cooling plate and the air by allowing external air to flow around the cooling plate is widely used.

However, in the case of the battery module that uses the air cooling type to cool the battery cells, it is important to stably maintain a cooling channel around the cooling plate so that the external air flows well through the cooling channel. However, in the conventional battery module, the cooling channel is not stably secured around the cooling plate. In particular, aluminum materials are widely used as the cooling plate, but a cooling plate made of aluminum is prone to deformation such as pressing or distortion during injection of a stacking frame, coupling to a frame, or use of the battery module.

The deformation of the cooling plate may reduce or block the cooling channel to disturb the flow of an external air through the cooling channel, thereby greatly lowering the cooling efficiency of the battery cells through the cooling plate. There has been proposed a configuration in which beads are formed on the cooling plate to prevent deformation of the cooling plate, but in this case, the beads may be deformed and thus the cooling channel may not be stably secured.

DISCLOSURE

Technical Problem

The present disclosure is directed to providing a cartridge for a battery cell, which may prevent swelling phenomenon from concentrating at the center of the battery cell by distributing and guiding the swelling phenomenon and gas generated at the battery cell to a sealing portion of the battery cell, and a battery module including the cartridge.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cartridge for battery cells, comprising: an upper cooling plate and a lower cooling plate having a plate shape and spaced to face each other, wherein a cooling channel is formed between the upper cooling plate and the lower cooling plate; a main frame surrounding an outer circumference of the upper cooling plate and an outer circumference of the lower cooling plate, wherein the main frame is configured to receive the battery cells on an upper portion and a lower portion of the main frame; and a support portion disposed at the cooling channel and having at least one support rib protruding in at least one of an upper direction and a lower direction, the at least one support rib supporting to support the upper cooling plate and the lower cooling plate.

Preferably, a vertical length of the at least one support rib between an upper surface and a lower surface of the at least one support rib may be equal to or greater than a minimum spacing distance between the upper cooling plate and the lower cooling plate.

Preferably, the at least one support rib may be formed at a center portion of the cooling channel in the flow direction of the cooling channel.

Preferably, the at least one support rib is provided in plurality, each support rib has an upper surface, a lower surface and a vertical length extending between the upper surface and the lower surface, and the support ribs have a progressive longer vertical length the further away from a sealing portion of the battery cell.

Preferably, the at least one support rib may be provided in plurality in the flow direction of the cooling channel.

Preferably, vertical lengths of the plurality of support ribs between upper surfaces and lower surfaces thereof may be different from each other.

Preferably, the plurality of support ribs may be formed to at least one of a front end, a center portion and a rear end of the cooling channel in the flow direction of the cooling channel.

Preferably, the vertical length of the support rib formed at the center portion may be longer than the vertical lengths of the support ribs formed at the front end and the rear end.

Preferably, the support portion may further include a support bar having a bar shape elongated in the flow direction of the cooling channel so that the at least one support rib protrudes from an upper surface and a lower surface of the support bar.

Preferably, the at least one support rib may include coupling protrusions formed to protrude from an upper surface of the at least one support rib that supports the upper cooling plate and a lower surface of the at least one support rib that supports the lower cooling plate.

Preferably, the upper cooling plate and the lower cooling plate may have recessed coupling grooves respectively formed at respective inner surfaces and the coupling protrusions are inserted and coupled in the recessed coupling grooves of the upper cooling plate and the lower cooling plate.

Preferably, the upper cooling plate and the lower cooling plate may be inclined and correspond to a vertical length of the at least one support rib between an upper surface and a lower surface of the at least one support rib.

Preferably, the upper cooling plate may have an upper surface making surface contact with a first battery cell among the battery cells.

Preferably, the lower cooling plate may have a lower surface making surface contact with a second battery cell among the battery cells.

In another aspect of the present disclosure, there is also provided a battery module comprising a cartridge for battery cells.

In another aspect of the present disclosure, there is also provided a battery pack comprising a cartridge for battery cells.

In another aspect of the present disclosure, there is also provided a vehicle comprising a cartridge for battery cells.

Advantageous Effects

According to the present disclosure, swelling phenomenon and gas generated at the battery cell is distributed and guided to a sealing portion of the battery cell to prevent the swelling phenomenon from concentrating at the center of the battery cell, thereby preventing the battery performance of the battery cell from deteriorating due to the swelling phenomenon.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the explanations of the present disclosure, if it is deemed that any specific explanation of the related configuration or function can obscure the gist of the present disclosure, the detailed explanation may be omitted.

The embodiments of the present disclosure are provided to more fully describe the present disclosure to those skilled in the art, so the shape and size of the components may be exaggerated, omitted or schematically illustrated in the figures for more definite explanation. Thus, the size or ratio of the components does not entirely reflect the actual size or ratio.

A cartridge for a battery cell according to the present disclosure is used to configure a battery module by stacking or packaging a plurality of battery cells, and may hold the battery cells to prevent the movement of the battery cells and guide assembling of the battery cells.

Figure 1:
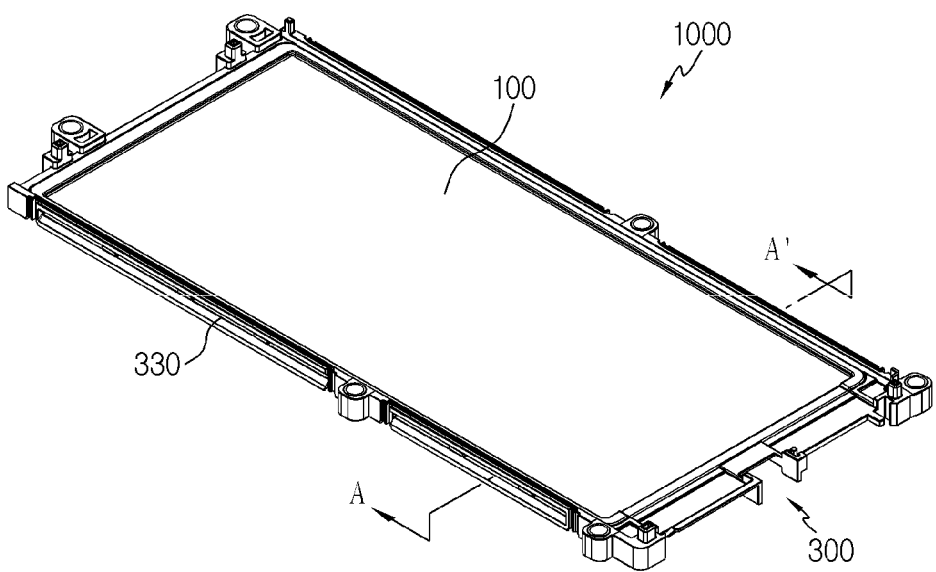
FIG. 1 is a perspective view schematically showing a cartridge for a battery cell according to an embodiment of the present disclosure.
Figure 2:
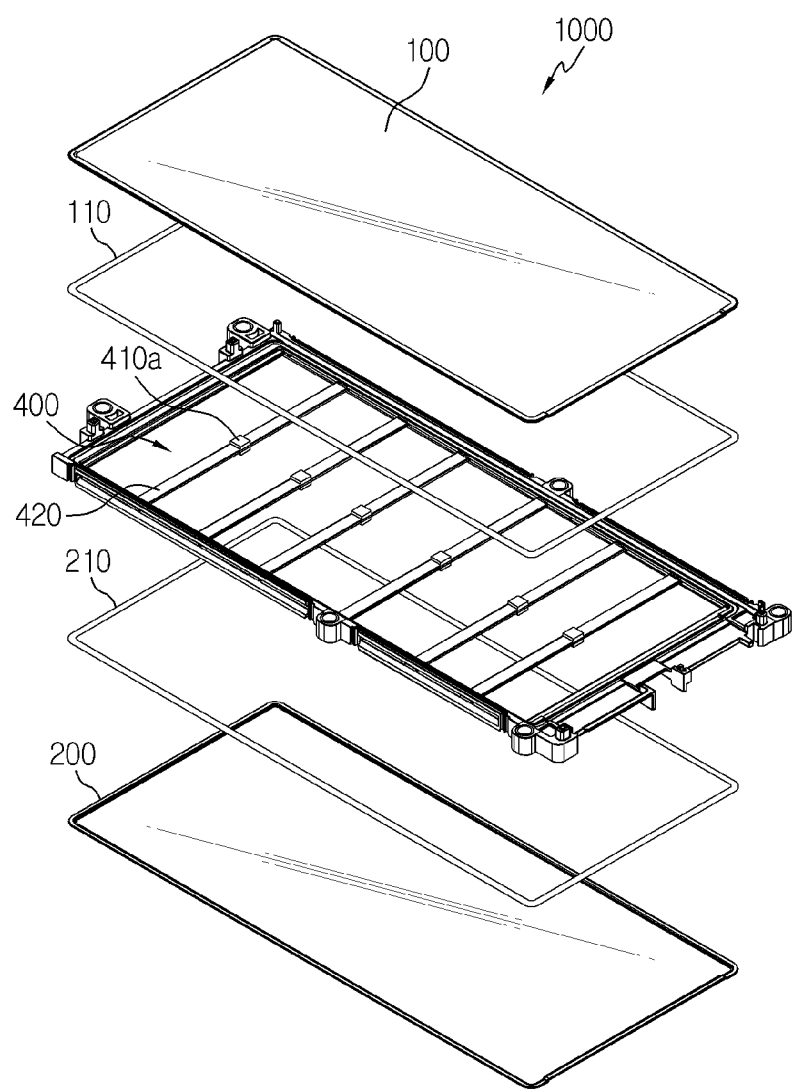
FIG. 2 is an exploded perspective view schematically showing the cartridge for a battery cell according to an embodiment of the present disclosure.
Figure 3:
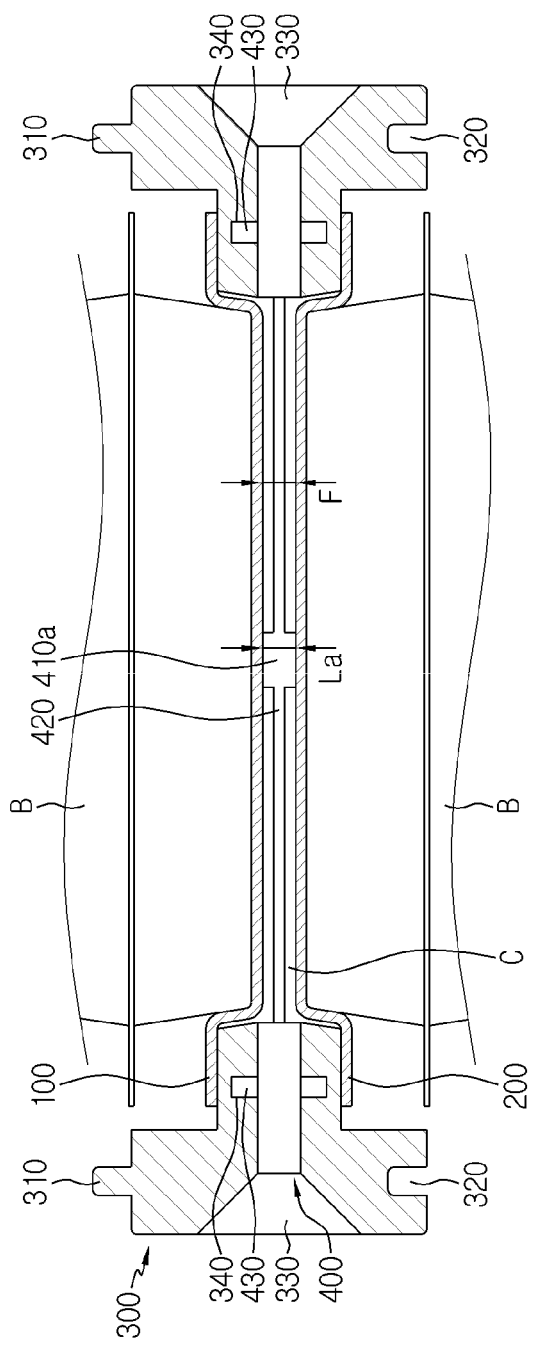
FIG. 3 is a cross-sectioned view, taken along the line A-A' of FIG. 1.
Figure 4:
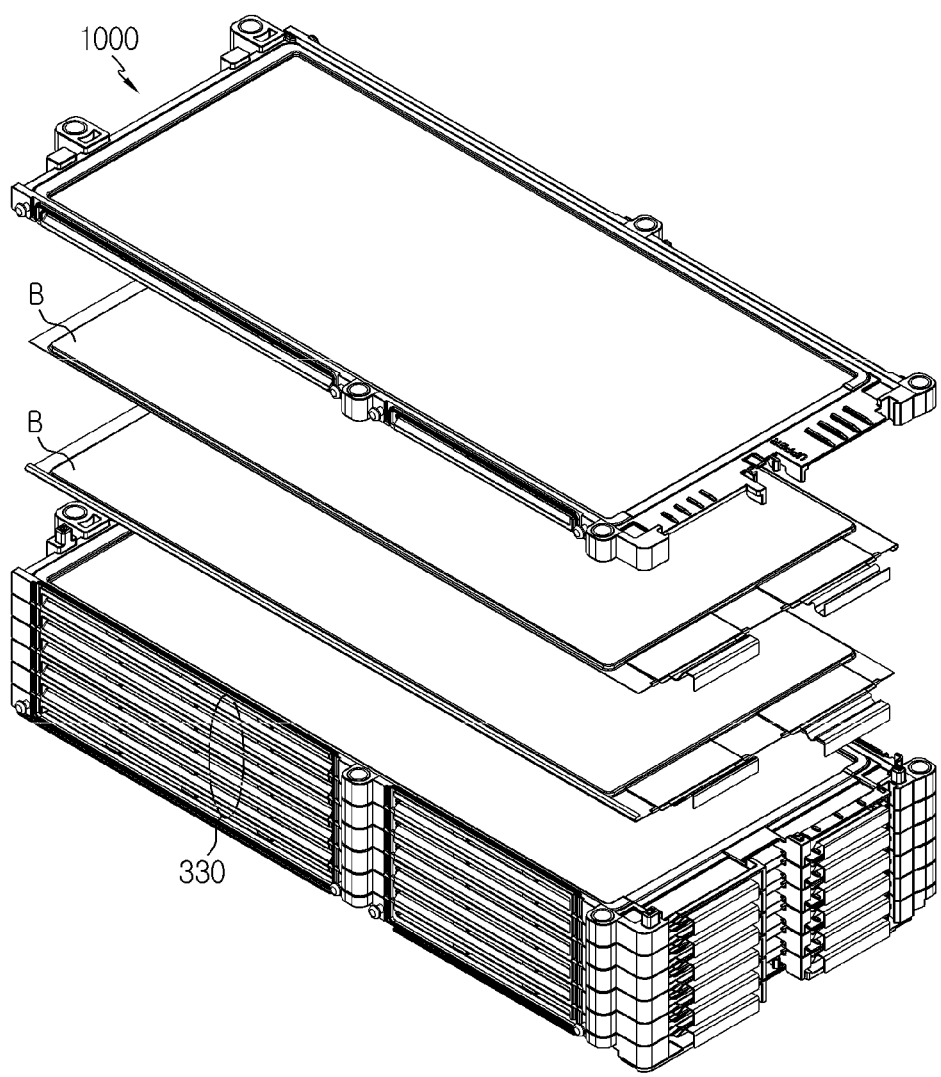
FIG. 4 is a diagram showing that the cartridges for a battery cell are stacked according to an embodiment of the present disclosure.

FIG. 1 is a perspective view schematically showing a cartridge for a battery cell according to an embodiment of the present disclosure, FIG. 2 is an exploded perspective view schematically showing the cartridge for a battery cell according to an embodiment of the present disclosure, FIG. 3 is a cross-sectioned view, taken along the line A-A' of FIG. 1, and FIG. 4 is a diagram showing that the cartridges for a battery cell are stacked according to an embodiment of the present disclosure.

Retelling to FIGS. 1 to 4, a cartridge for a battery cell 1000 according to the present disclosure includes an upper cooling plate 100, a lower cooling plate 200, a main frame 300, and a support portion 400.

The upper cooling plate 100 may have a plate shape and be disposed in a lying-down state so that its broad surfaces face upward and downward. In particular, the upper cooling plate 100 may have a rectangular plate shape.

The lower cooling plate 200 may also have a plate shape, similar to upper cooling plate 100, and may be formed in a shape corresponding to the upper cooling plate 100, for example to have the same shape as the upper cooling plate 100. In particular, the lower cooling plate 200 may be disposed below the upper cooling plate 100 such that its broad surface faces a broad surface of the upper cooling plate 100.

At this time, as shown in FIG. 3, the lower cooling plate 200 may be disposed to be spaced apart from the upper cooling plate 100 by a predetermined distance to form a cooling channel C therein.

The upper cooling plate 100 and the lower cooling plate 200 may be made of a material with thermal conductivity to exchange heat with battery cells B respectively located at upper portions and lower portions thereof. In particular, two cooling plates as described above may be made of aluminum material which is excellent in thermal conductivity, easy to mold, and light in weight. However, the present disclosure is not limited to the cooling plate materials, and the cooling plate may be made of various other materials such as metals other than aluminum.

Meanwhile, the upper cooling plate 100 and the lower cooling plate 200 may include an upper bonding portion 110 and a lower bonding portion 210, adhered and fixed to the main frame 300, respectively. Here, the upper bonding portion 110 forms a rim of the upper cooling plate 100, and the lower bonding portion 210 forms a rim of the lower cooling plate 200.

As shown in FIG. 2, the upper bonding portion 110 may be shaped corresponding to the rim of the upper cooling plate 100, and the lower bonding portion 210 may be shaped corresponding to the rim of the lower cooling plate 200.

That is, the upper bonding portion 110 and the lower bonding portion 210 may have a rectangular ring shape.

According to this configuration, when the upper cooling plate 100 is mounted to the main frame 300, the upper bonding portion 110 may bond the rim of the upper cooling plate 100 to a top surface of the main frame 300. Also, when the lower cooling plate 200 is mounted to the main frame 300, the lower bonding portion 210 may bond the rim of the lower cooling plate 200 to a bottom surface of the main frame 300.

Accordingly, the possibility of forming a gap at the coupling portion between the upper cooling plate 100 and the main frame 300 and at the coupling portion between the lower cooling plate 200 and the main frame 300 is lowered, thereby increasing the coupling force and the sealing performance further. In particular, if gas is generated in the battery cell B, it is possible to prevent the gas from leaking out respectively at the coupling portion of the upper cooling plate 100 and the main frame 300 and at the coupling portion of the lower cooling plate 200 and the main frame 300 due to the upper bonding portion 110 and the lower bonding portion 210.

The main frame 300 may be configured to surround outer circumferences of the upper cooling plate 100 and the lower cooling plate 200. In particular, as shown in FIG. 1, the main frame 300 may have a rectangular ring shape with an empty center portion, when being observed from an upper side to a lower side.

At the empty center portion of the main frame 300, the upper cooling plate 100 may be exposed in an upper direction and the lower cooling plate 200 may be exposed in a lower direction.

The main frame 300 may be made by injection molding or the like in a state where the upper cooling plate 100 and the lower cooling plate 200 are interposed therein, but the present disclosure is not necessarily restricted to the manufacturing method.

The main frame 300 may be configured so that a pouch-type battery cell B is mounted thereto. In particular, the main frame 300 may be configured so that an outer circumference of the pouch-type battery cell B is mounted thereto. For example, as shown in FIG. 1, four sides of a rectangular pouch-type battery cell B may be respectively placed on inner sides of the main frame 300.

At this time, the outer circumference of the pouch-type battery cell B having four sides may be configured so that all four sides are placed on the main frame 300, or some of the four sides, for example two sides, are placed on the main frame 300.

Preferably, two pouch-type battery cells may be mounted to the main frame 300. That is, the upper cooling plate 100 and the lower cooling plate 200 may be positioned at the center portion of the main frame 300 in the vertical direction, and two pouch-type battery cells may be disposed at an upper portion of the upper cooling plate 100 and a lower portion of the lower cooling plate 200, respectively, in the main frame 300. Thus, in this case, if a plurality of cartridges for a battery cell 1000 are vertically stacked, two battery cells may be accommodated for each cartridge for a battery cell 1000

Two or more main frames 300 may be stacked on one another, and thus two or more cartridges for a battery cell 1000 may be stacked. That is, in the main frames 300, different main frames may be stacked at an upper portion and a lower portion. If two or more cartridges for a battery cell 1000 are stacked as above, the main frame 300 is disposed at the outer circumference with respect to the battery cell B, and the upper cooling plate 100 is disposed at an upper portion and the lower cooling plate 200 is disposed at a lower portion.

Meanwhile, the main frame 300 may have a protrusion 310 vertically protruding and an insert groove 320 shaped corresponding to the protrusion 310 so that two or more main frames may be stacked easily.

For example, as shown in FIG. 3, the main frame 300 may have the protrusion 310 protruding upward in the upper direction at an upper portion thereof. In addition, the main frame 300 may have the recessed insert groove 320 formed at a lower portion thereof and shaped corresponding to the protrusion 310. In this case, as shown in FIG. 4, when the cartridges for a battery cell 1000 are stacked in the vertical direction, the protrusion 310 of the main frame 300 may be inserted into an insert groove of another main frame located at an upper layer. Also, a protrusion of another main frame located at a lower layer may be inserted into the insert groove 320 of the main frame 300.

According to this embodiment, the protrusion 310 and the insert groove 320 guide the stacking of the main frames 300, namely the stacking of the cartridges for a battery cell, to allow easy stacking. Also, even after the stacking process, the stacked state may be stably maintained due to the coupling force of the protrusion 310 and the insert groove 320.

Meanwhile, as in FIGS. 1 to 3, the main frame 300 may have an opening 330 at a side surface thereof. Here, the opening 330 may be formed to pass through the main frame 300 in the horizontal direction so that at least a part of the empty space between the upper cooling plate 100 and the lower cooling plate 200 is exposed to the outside. That is, in the cartridge for a battery cell according to the present disclosure, the empty space is formed between the upper cooling plate 100 and the lower cooling plate 200 to serve as a cooling channel C, and the opening allows the cooling channel C to be exposed to the outside of the main frame 300. Thus, an external air out of the main frame 300 may flow into or out of the cooling channel C through the opening 330.

At this time, it is preferable that at least two openings 330 are formed in the main frame 300. In this case, at least one opening 330 may serve as an inlet and the remaining opening 330 may serve as an outlet.

Thus, the external air introduced into the left opening 330 may exchange heat with the battery cell B while flowing along the cooling channel C between the upper cooling plate 100 and the lower cooling plate 200. In addition, the air having exchanged heat with the upper cooling plate 100 and the lower cooling plate 200 may be discharged to the outer space of the main frame 300 through the opening 330 at an opposite side.

The support portion 400 includes at least one support rib 410a disposed at the cooling channel C formed between the upper cooling plate 100 and the lower cooling plate 200 and protruding in at least one of an upper direction and a lower direction to support the upper cooling plate 100 and the lower cooling plate 200.

In addition, the support portion 400 may include at least one support bar 420 having an upper surface and a lower surface from which at least one support rib 410a protrudes.

That is, as shown in FIG. 3, the support portion 400 includes at least one support bar 420 having one end fixed to the opening 330 formed at one side of the main frame 300 and the other end fixedly installed to the opening 330 formed at the other side of the main frame 300. Each of the at least one support bar 420 may have at least one support rib 410a.

In an embodiment, one support rib 410a may be formed at each of the at least one support bar 420.

The support rib 410a protrudes upward and downward so that its upper surface contacts the lower portion of the upper cooling plate 100 and its lower surface contacts the upper portion of the lower cooling plate 200.

Accordingly, the support rib 410a may support the upper cooling plate 100 in the upper direction and support the lower cooling plate 200 in the lower direction.

For this, the support rib 410a may be formed such that its vertical length La between an upper surface and a lower surface thereof is equal to or greater than a minimum spacing distance F between the upper cooling plate 100 and the lower cooling plate 200.

For example, as shown in FIG. 3, the vertical length La of the support rib 410a between the upper surface and the lower surface thereof may be equal to the minimum spacing distance F between the upper cooling plate 100 and the lower cooling plate 200.

Also, the support rib 410a may be formed at a center portion of the cooling channel C in the flow direction of the cooling channel C. In other words, the support rib 410a may be formed at the center of the support bar 420 in the longitudinal direction of the support bar 420.

Accordingly, the support rib 410a may contact the center of the lower surface of the upper cooling plate 100 and the center of the upper surface of the lower cooling plate 200 to support the upper cooling plate 100 and the lower cooling plate 200, respectively.

Meanwhile, if a swelling phenomenon occurs at the battery cell B to increase its volume due to abnormality such as overcharging, overdischarge, electric shock or the like, the center portion of the battery cell B usually increases in volume more than the peripheral portion thereof.

Accordingly, according to the configuration of the present disclosure as described above, when a swelling phenomenon occurs at the battery cell B, the support rib 410a supports the center of the lower surface of the upper cooling plate 100 and the center of the upper surface of the lower cooling plate 200, which are in contact with the center of the battery cell B that increases in volume more than the peripheral portion thereof, thereby distributing the swelling phenomenon to the peripheral portions of the battery cell B.

Figure 5:
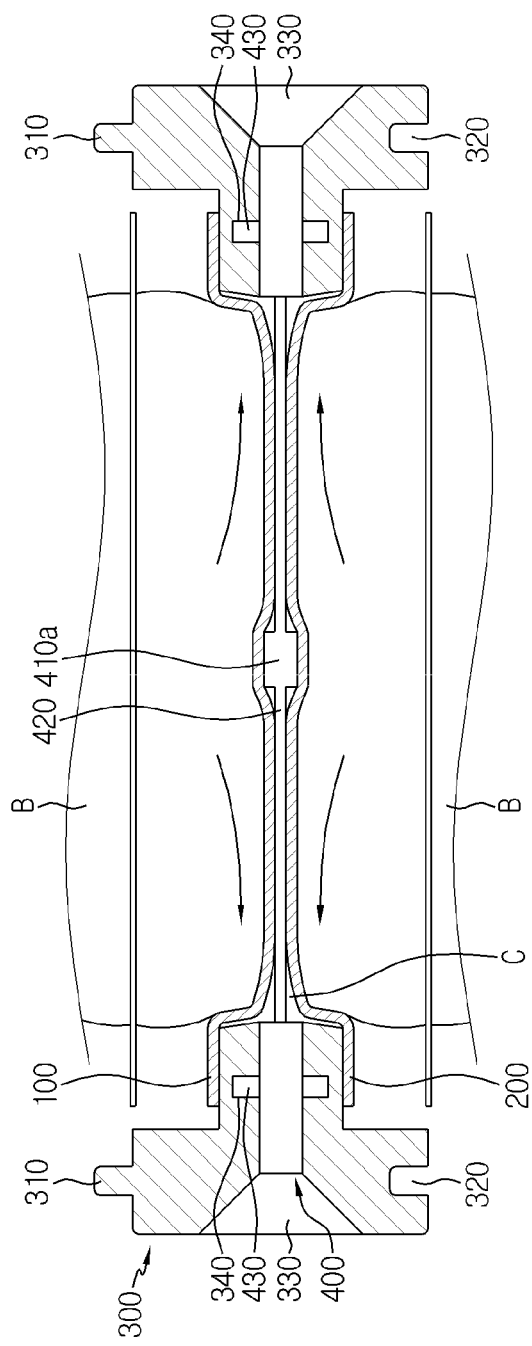
FIG. 5 is a cross-sectioned view showing the cartridge for a battery cell according to an embodiment after swelling phenomenon occurs at the battery cell, taken along the line A-A'.

FIG. 5 is a cross-sectioned view showing the cartridge for a battery cell according to an embodiment after swelling phenomenon occurs at the battery cell, taken along the line A-A'.

Referring to FIG. 5 further, as described above, the support rib 410a may respectively support the center of the lower surface of the upper cooling plate 100 and the center of the upper surface of the lower cooling plate 200, which are in contact with the center of the battery cell B.

By doing so, the support rib 410a may distribute a swelling phenomenon concentrated at the center of the battery cell B to the peripheral portions of the battery cell B and delay the swelling phenomenon occurring at the center of the battery cell B.

In addition, the support rib 410a may distribute a gas generated from the battery cell B and concentrated at the center thereof to peripheral portions of the battery cell B, particularly to a sealing portion.

As shown in FIG. 5, the support rib 410a may distribute the swelling phenomenon and the gas to the peripheral portions of the battery cell B, namely toward both the front end and the rear end of the battery cell B where the sealing portions are formed.

Accordingly, the gas distributed to the sealing portions of the battery cell B through the support rib 410a is discharged through the gap between the sealing portions, thereby preventing the life of the battery cell B from being shortened due to excessive swelling.

The support portion 400 is a structure for supporting the upper cooling plate 100 and the lower cooling plate 200 and may be made of a material with a mechanical strength over a predetermined level. For example, the support portion 400 may be made of a metal material such as steel or a plastic material.

Preferably, the support bar 420 of the support portion 400 may be fastened to the main frame 300 so that one end and the other end of the support bar 420 are fixed to the main frame 300 not to move.

For this, the support portion 400 may have coupling protrusions 430 respectively formed at one end and the other end thereof, which are in contact with the main frame 300, to protrude upward and downward.

The coupling protrusion 430 may be inserted into the coupling groove 340 concavely formed at the inner side of the main frame 300 to fasten the support portion 400 to the main frame 300.

Figure 6:
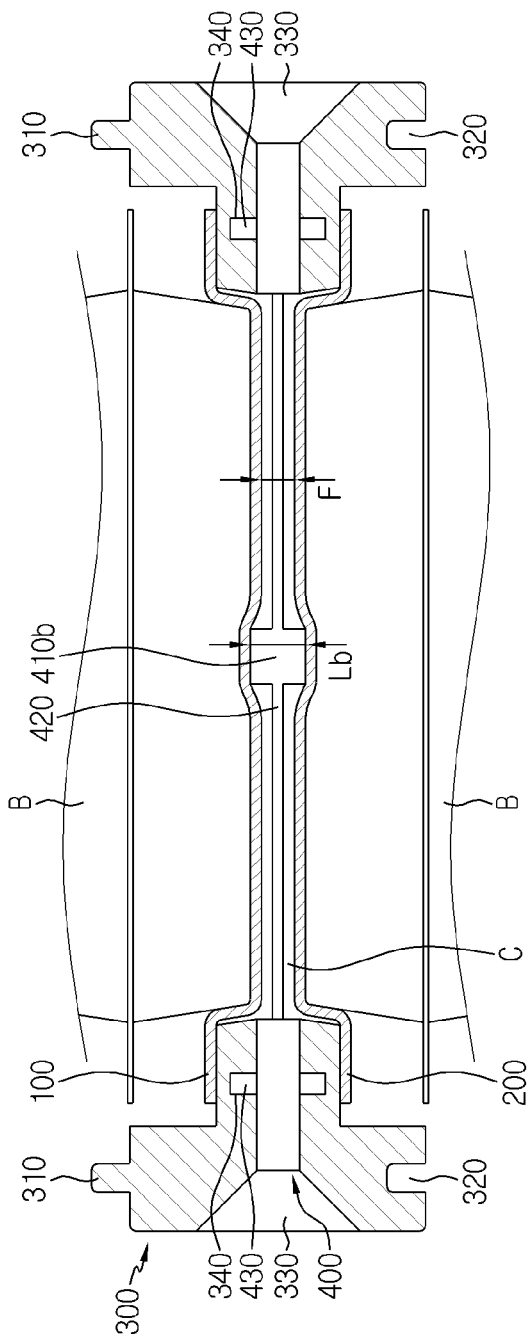
FIG. 6 is a cross-sectioned view showing a cartridge for a battery cell according to another embodiment of the present disclosure.

FIG. 6 is a cross-sectioned view showing a cartridge for a battery cell according to another embodiment of the present disclosure.

The cartridge for a battery cell according to another embodiment of the present disclosure is different from the cartridge for a battery cell of the former embodiment only in terms of the support rib, and other components are identical and thus are not described in detail here.

Referring to FIG. 6, the support portion 400 employed at the cartridge for a battery cell according to another embodiment may include at least one support rib 410b.

More specifically, one support rib 410b may be formed at each of the at least one support bar 420.

The support rib 410b may be formed so that its vertical length Lb between an upper surface and a lower surface thereof is longer than the minimum spacing distance F between the upper cooling plate 100 and the lower cooling plate 200.

For example, as shown in FIG. 6, the vertical length Lb of the support rib 410b between the upper surface and the lower surface thereof may be longer than the minimum spacing distance F between the upper cooling plate 100 and the lower cooling plate 200.

In addition, the support rib 410b may be formed at the center portion of the cooling channel C in the flow direction of the cooling channel C. In other words, the support rib 410b may be formed at the center of the support bar 420 in the longitudinal direction of the support bar 420.

Accordingly, the support rib 410b may contact the center of the lower surface of the upper cooling plate 100 and the center of the upper surface of the lower cooling plate 200, respectively, to support the upper cooling plate 100 and the lower cooling plate 200.

By doing so, the support rib 410b may more effectively reduce the swelling phenomenon occurring at the center of the battery cell B, which increases in volume more than the peripheral portions thereof, compared to the support rib of the former embodiment.

Accordingly, according to the configuration of the present disclosure as described above, when a swelling phenomenon occurs at the battery cell B, the support rib 410b respectively compress and support the center of the lower surface of the upper cooling plate 100 and the center of the upper surface of the lower cooling plate 200, which are in contact with the center of the battery cell B, thereby distributing the swelling phenomenon to the peripheral portions of the battery cell B.

Figure 7:
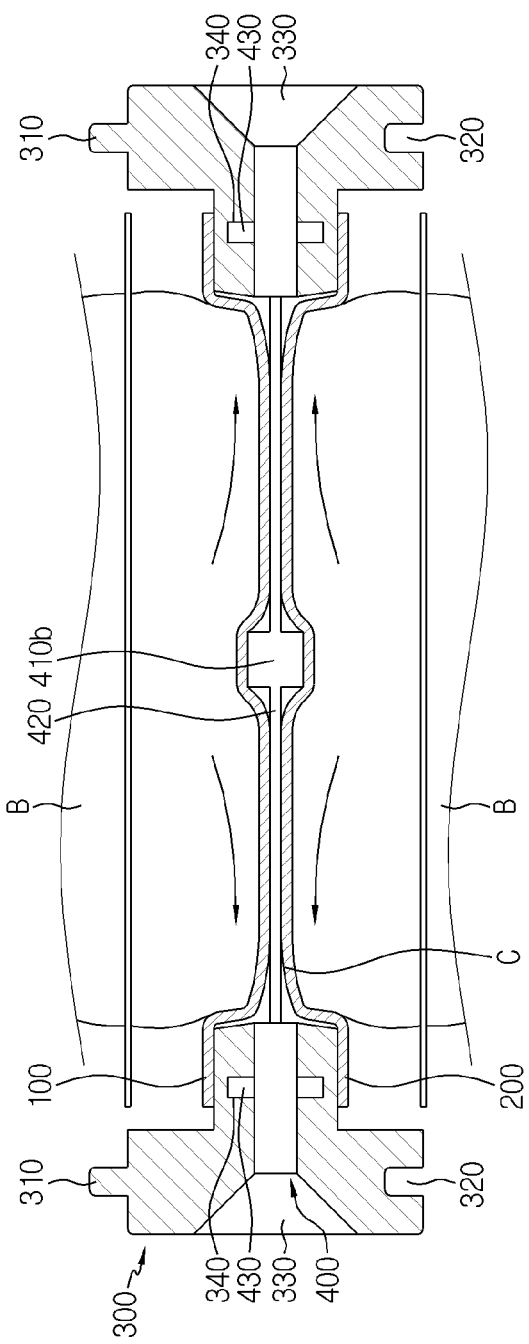
FIG. 7 is a cross-sectioned view showing the cartridge for a battery cell according to another embodiment after swelling phenomenon occurs at the battery cell, taken along the line A-A'.

FIG. 7 is a cross-sectioned view showing the cartridge for a battery cell according to another embodiment after swelling phenomenon occurs at the battery cell, taken along the line A-A'.

Referring to FIG. 7 further, the support rib 410b may respectively support the center of the lower surface of the upper cooling plate 100 and the center of the upper surface of the lower cooling plate 200, which are in contact with the center of the battery cell B, as described above.

Specifically, the support rib 410b may be formed so that its vertical length Lb between the upper surface and the lower surface thereof is longer than the minimum spacing distance F between the upper cooling plate 100 and the lower cooling plate 200, thereby effectively pressing the center of the lower surface of the upper cooling plate 100 and the center of the upper surface of the lower cooling plate 200, respectively.

By doing so, the support rib 410b may distribute the swelling phenomenon concentrated at the center of the battery cell B to the peripheral portions of the battery cell B and delay the swelling phenomenon occurring at the center of the battery cell B.

In addition, the support rib 410b may distribute the gas generated from the battery cell B concentrated at the center portion to the peripheral portions of the battery cell B, particularly to the sealing portions.

As shown in FIG. 7, the support rib 410b may distribute the swelling phenomenon and the gas to the peripheral portions of the battery cell B, namely toward both the front end and the rear end where the sealing portions of the battery cell B are formed.

Accordingly, the gas distributed to the sealing portions of the battery cell B through the support rib 410b is discharged through the gap between the sealing portions, thereby preventing the life of the battery cell B from being shortened due to excessive swelling.

Figure 8:
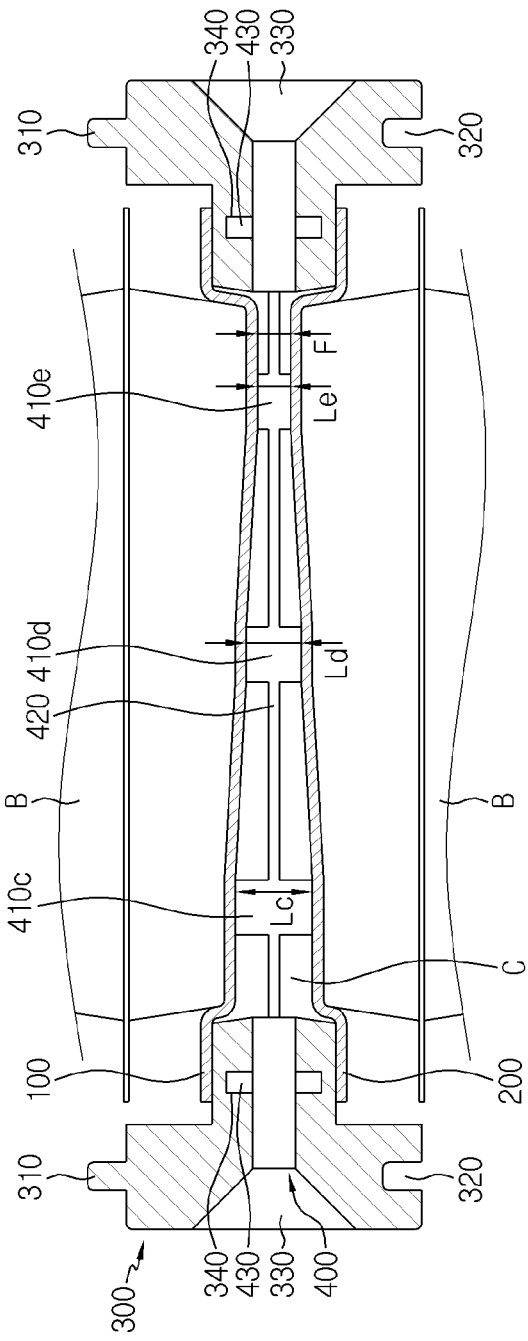
FIG. 8 is a cross-sectioned view showing a cartridge for a battery cell according to still another embodiment of the present disclosure.

FIG. 8 is a cross-sectioned view showing a cartridge for a battery cell according to still another embodiment of the present disclosure.

The cartridge for a battery cell according to still another embodiment of the present disclosure is different from the cartridge for a battery cell of the former embodiment only in terms of the support rib, and other components are identical and thus are not described in detail here.

Referring to FIG. 8, the support portion 400 employed at the cartridge for a battery cell according to still another embodiment may include a plurality of support ribs 410c, 410d, 410e.

More specifically, the plurality of support ribs 410c, 410d, 410e may be formed at each of the at least one support bar 420.

The plurality of support ribs 410c, 410d, 410e may be formed so that their vertical lengths Lc, Ld, Le between the upper surface and the lower surface thereof is equal to or greater than the minimum spacing distance F between the upper cooling plate 100 and the lower cooling plate 200.

In addition, the vertical lengths Lc, Ld, Le of the plurality of support ribs 410c, 410d, 410e between the upper surface and the lower surface thereof may be longer as being away from the sealing portion.

In still another embodiment, if the sealing portion of the battery cell B is close to the rear end of the cooling channel C as shown in FIG. 8, the plurality of support ribs 410c, 410d, 410e may include three support ribs, namely a support rib 410c formed at the front end of the cooling channel C, a support rib 410d formed at the center of the cooling channel C, and a support rib 410e formed at the rear end of the cooling channel C.

In addition, since the support rib 410e formed at the rear end of the cooling channel C is close to the sealing portion, the vertical length Le of the support rib 410e between the upper surface and the lower surface thereof may be shorter than that of the support rib 410c formed at the front end of the cooling channel C and the support rib 410b formed at the center of the cooling channel C, and the length Le may be equal to the minimum spacing distance F.

Also, since the support rib 410d formed at the center of the cooling channel C is closer to the sealing portion than the support rib 410c formed at the front end of the cooling channel C, the vertical length Ld of the support rib 410d between the upper surface and the lower surface thereof may be shorter than the vertical length Lc between the upper surface and the lower surface of the formed support rib 410c formed at the front end of the cooling channel C.

Finally, since the support rib 410c formed at the front end of the cooling channel C is disposed further away from the sealing portion than the support rib 410d formed at the center of the cooling channel C and the support rib 410e formed at the rear end of the cooling channel C, the vertical length Lc of the support rib 410c between the upper surface and the lower surface thereof may be longest.

That is, the vertical lengths Lc, Ld, Le of the plurality of supporting ribs 410c, 410d, 410e between the upper surface and the lower surface thereof may be longer, as being away from the sealing portion of the battery cell B close to the rear end of the cooling channel C.

Accordingly, the upper cooling plate 100 and the lower cooling plate 200 may be arranged and fixed to be inclined corresponding to different vertical lengths of the plurality of support ribs 410c, 410d, 410e.

By doing so, the plurality of support ribs 410c, 410d, 410e may contact the front end, the center and the rear end of the lower surface of the inclined upper cooling plate 100 and the upper surface of the inclined lower cooling plate 200, respectively, to support the upper cooling plate 100 and the lower cooling plate 200.

According to the configuration of the present disclosure, the plurality of supporting ribbons 410c, 410d, 410e may guide the swelling phenomenon and the gas generated at the battery cell B to the sealing portion formed at one side of the battery cell B.

Figure 9:
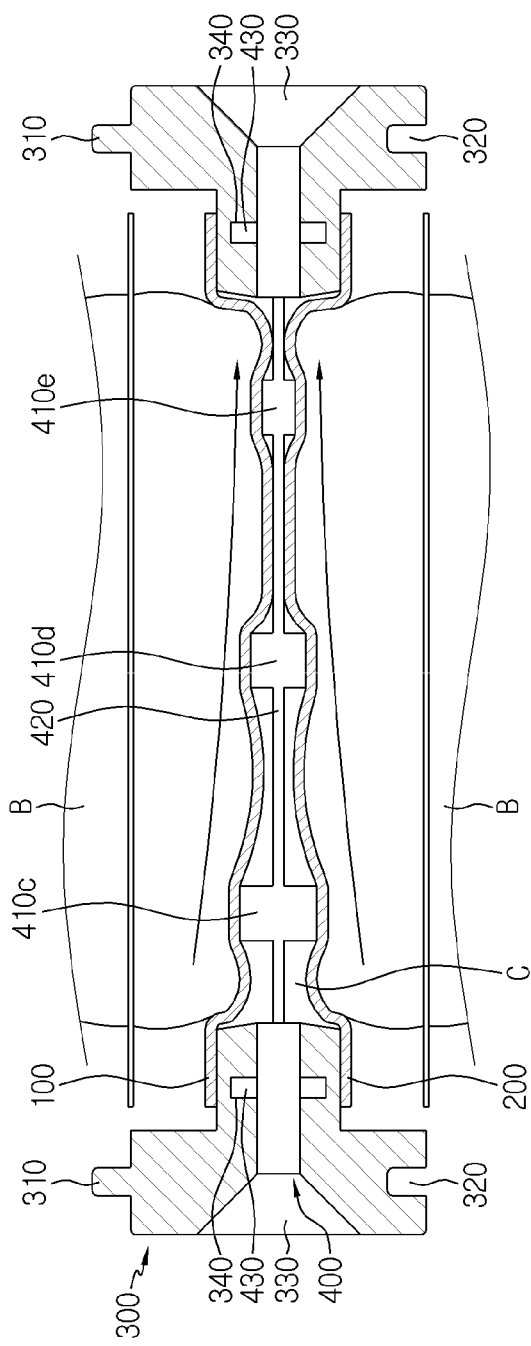
FIG. 9 is a cross-sectioned view showing the cartridge for a battery cell according to still another embodiment after swelling phenomenon occurs at the battery cell, taken along the line A-A'.

FIG. 9 is a cross-sectioned view showing the cartridge for a battery cell according to still another embodiment after swelling phenomenon occurs at the battery cell, taken along the line A-A'.

Referring to FIG. 9 further, the plurality of supporting ribs 410c, 410d, 410e may support the lower surface of the upper cooling plate 100 and the upper surface of the lower cooling plate 200, which are respectively in contact with the front end, the center and the rear end of the battery cell B, as described above.

By doing so, if the swelling phenomenon and the gas are generated at the battery cell B, the plurality of support ribs 410c, 410d, 410e press the lower surface of the upper cooling plate 100 and the upper surface of the lower cooling plate 200 with a higher pressure as being away from the sealing portion of the battery cell B, thereby guiding the generated gas to the sealing portion.

Accordingly, the gas guided to the sealing portion of the battery cell B by means of the plurality of support ribs 410c, 410d, 410e is discharged through the gap between the sealing portions, thereby preventing the life of the battery cell B from being shortened due to excessive swelling.

Figure 10:
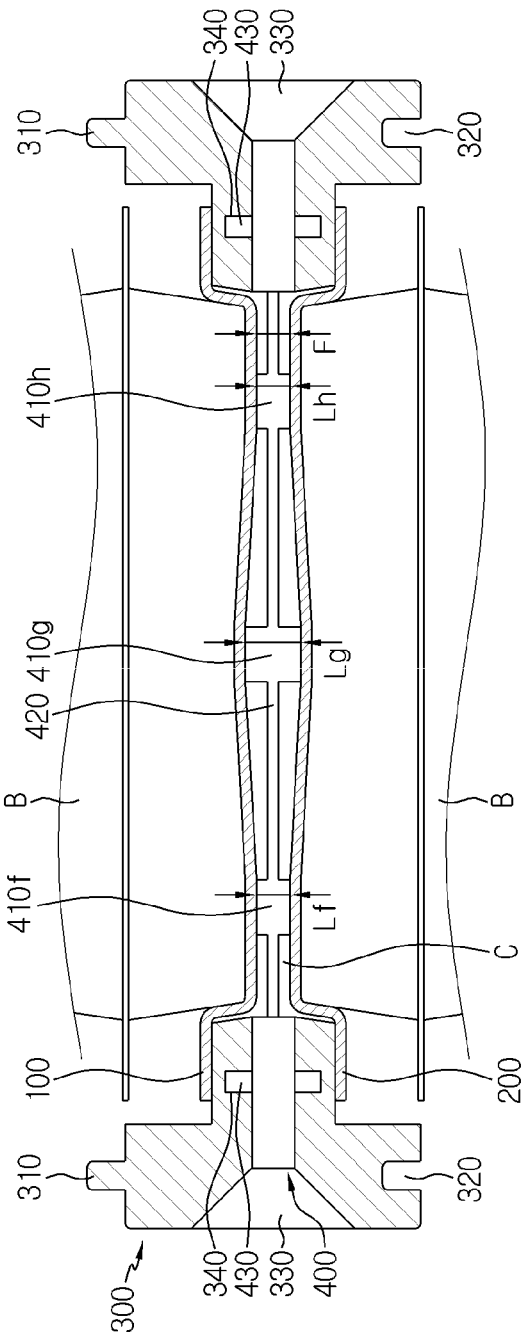
FIG. 10 is a cross-sectioned view showing a cartridge for a battery cell according to still another embodiment of the present disclosure.

FIG. 10 is a cross-sectioned view showing a cartridge for a battery cell according to still another embodiment of the present disclosure.

The cartridge for a battery cell according to still another embodiment of the present disclosure is different from the cartridge for a battery cell of the former embodiment only in terms of the support rib, and other components are identical and thus are not described in detail here.

Referring to FIG. 10, the support portion 400 employed at the cartridge for a battery cell according to still another embodiment includes a plurality of support ribs 410f, 410g, 410h.

More specifically, the plurality of support ribs 410f, 410g, 410h may be formed at each of the at least one support bar 420.

The plurality of support ribs 410f, 410g, 410h may be formed so that their vertical lengths Lf, Lg, Lh between the upper surface and the lower surface thereof is equal to or greater than the minimum spacing distance F between the upper cooling plate 100 and the lower cooling plate 200.

In addition, the vertical lengths Lf, Lg, Lh of the plurality of support ribs 410c, 410d, 410e between the upper surface and the lower surface thereof may be longer as being away from the sealing portion.

In still another embodiment, if the sealing portion of the battery cell B is close to the front end and the rear end of the cooling channel C as shown in FIG. 10, the plurality of support ribs 410c, 410d, 410e may include three support ribs, namely a support rib 410f formed at the front end of the cooling channel C, a support rib 410g formed at the center of the cooling channel C, and a support rib 410h formed at the rear end of the cooling channel C.

In addition, since the support rib 410f formed at the front end of the cooling channel C and the support rib 410h formed at the rear end of the cooling channel C are close to the sealing portion, the vertical lengths Lf, Lh of the support rib 410f and the support rib 410h between the upper surface and the lower surface thereof may be shorter than that of the support rib 410g formed at the center of the cooling channel C, and the lengths Lf, Lh may be equal to the minimum spacing distance F.

Also, since the support rib 410g formed at the center of the cooling channel C is disposed further away from the sealing portion than the support rib 410f formed at the front end of the cooling channel C and the support rib 410h formed at the rear end of the cooling channel C, the vertical length Lg of the support rib 410g between the upper surface and the lower surface thereof may be longest.

That is, the vertical lengths Lf, Lg, Lh of the plurality of supporting ribs 410f, 410g, 410h between the upper surface and the lower surface thereof may be longer, as being away from the sealing portion of the battery cell B close to the front end and the rear end of the cooling channel C.

Accordingly, the upper cooling plate 100 and the lower cooling plate 200 may be arranged and fixed to be inclined corresponding to different vertical lengths of the plurality of support ribs 410f, 410g, 410h.

By doing so, the plurality of support ribs 410f, 410g, 410h may contact the front end, the center and the rear end of the lower surface of the inclined upper cooling plate 100 and the upper surface of the inclined lower cooling plate 200, respectively, to support the upper cooling plate 100 and the lower cooling plate 200.

According to the configuration of the present disclosure, the plurality of supporting ribbons 410f, 410g, 410h may guide the swelling phenomenon and the gas generated at the battery cell B to the sealing portions formed at one side and the other side of the battery cell B. In other words, the plurality of support ribs 410f, 410g, 410h may guide the swelling phenomenon and the gas generated at the battery cell B from the center portion to both ends, namely to the front end and the rear end.

Figure 11:
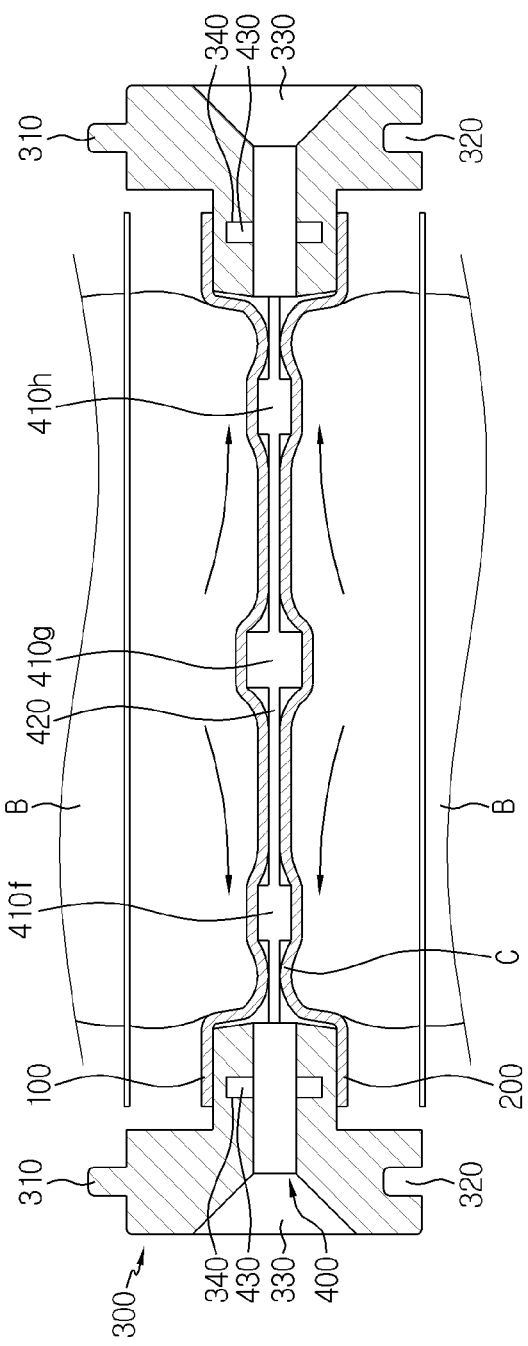
FIG. 11 is a cross-sectioned view showing the cartridge for a battery cell according to still another embodiment after swelling phenomenon occurs at the battery cell, taken along the line A-A'.

FIG. 11 is a cross-sectioned view showing the cartridge for a battery cell according to still another embodiment after swelling phenomenon occurs at the battery cell, taken along the line A-A'.

Referring to FIG. 11 further, the plurality of supporting ribs 410f, 410g, 410h may support the lower surface of the upper cooling plate 100 and the upper surface of the lower cooling plate 200, which are respectively in contact with the front end, the center and the rear end of the battery cell B, as described above.

By doing so, if the swelling phenomenon and the gas are generated at the battery cell B, the plurality of support ribs 410f, 410g, 410h press the lower surface of the upper cooling plate 100 and the upper surface of the lower cooling plate 200 with a higher pressure as being away from the sealing portion of the battery cell B, thereby guiding the generated gas to the sealing portions at the front end and the rear end.

Accordingly, the gas generated at the center portion is guided to the sealing portions of the battery cell B by means of the plurality of support ribs 410f, 410g, 410h and is discharged through the gap between the sealing portions, thereby preventing the life of the battery cell B from being shortened due to excessive swelling.

Figure 12:
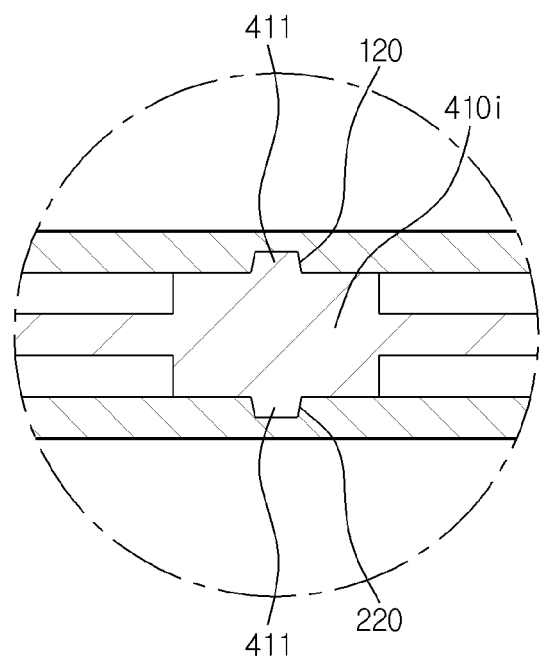
FIG. 12 is an enlarged view showing a section of a cartridge for a battery cell according to still another embodiment of the present disclosure.

FIG. 12 is an enlarged view showing a section of a cartridge for a battery cell according to still another embodiment of the present disclosure.

Referring to FIG. 12, the cartridge for a battery cell according to still another disclosure of the present disclosure may include coupling protrusions 411 formed to protrude upward and downward from the upper surface and the lower surface of a support rib 410i of the support portion 400, respectively.

The coupling protrusions 411 may be inserted into a recessed coupling groove 120 formed at the lower surface of the upper cooling plate 100 and a recessed coupling groove 220 formed at the upper surface of the lower cooling plate 200, respectively.

By doing so, if the swelling phenomenon occurs in the battery cell B to increase the volume, a pressure is applied to the upper cooling plate 100 and the lower cooling plate 200 to prevent the coupling between the support portion 400 and the upper cooling plate 100 and the coupling between the support portion 400 and the lower cooling plate 200 from being released.

According to the configuration of the present disclosure, even though a pressure is applied due to the swelling phenomenon of the battery cell B or an external impact, the coupling between the support portion 400 and the upper cooling plate 100 and the coupling between the support portion 400 and the lower cooling plate 200 may be securely maintained.

Figure 13:
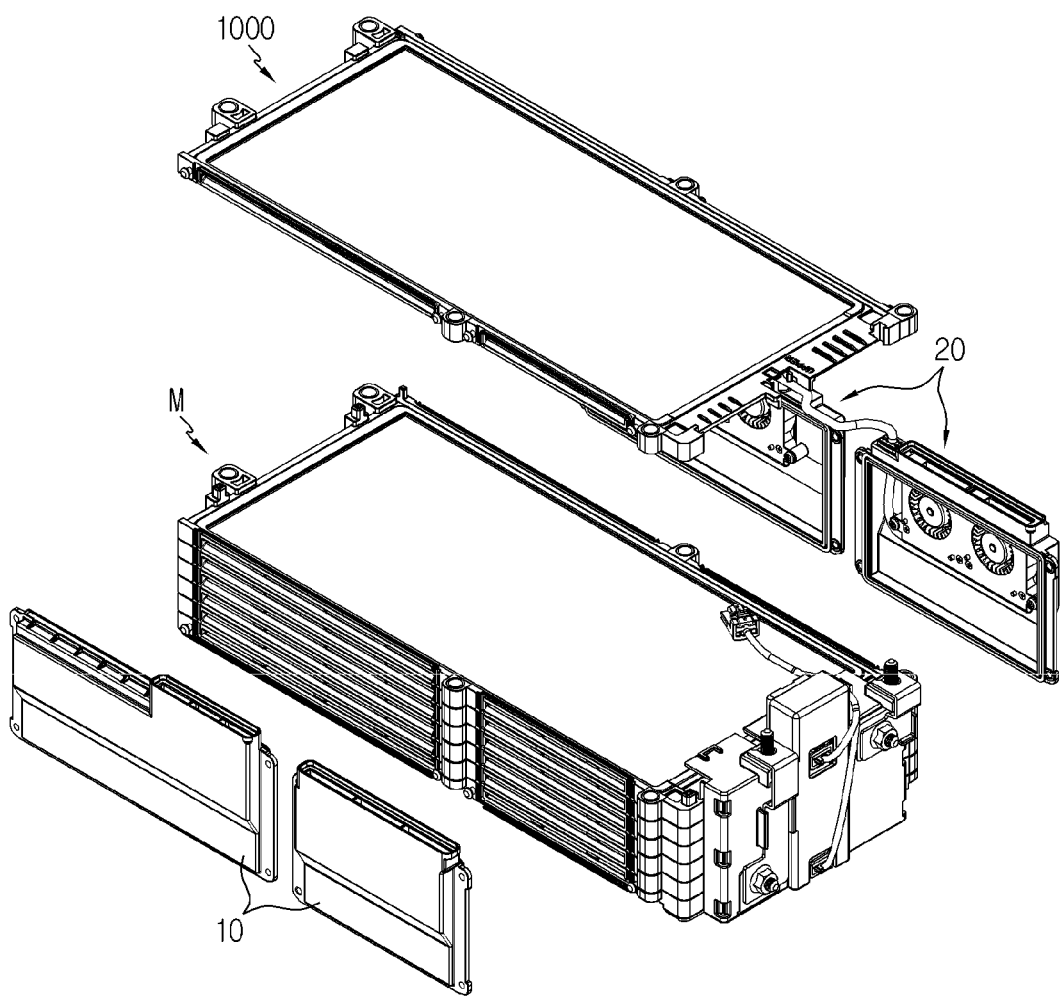
FIG. 13 is an exploded perspective view schematically showing a battery module according to an embodiment of the present disclosure.

FIG. 13 is an exploded perspective view schematically showing a battery module according to an embodiment of the present disclosure.

As shown in FIG. 13, a battery module M according to the present disclosure may further include an inlet duct 10 and an outlet duct 20, in addition to a battery cell and a cartridge 1000 for the battery cell. Here, the inlet duct 10 may be provided at an open portion of a cooling channel formed at the cartridge 1000 for a battery cell to serve as a space and a passage through which fluid flows into the cooling channel.

In addition, the outlet duct 20 may be provided at another open portion of the cooling channel formed at the cartridge 1000 for a battery cell to serve as a space and a passage through which the fluid flowing through the cooling channel flows out of the battery module M. In particular, in the cartridge 1000 for a battery cell according to an embodiment of the present disclosure, the openings 330 may be formed at two sides of the main frame 300. The inlet duct 10 and the outlet duct 20 are respectively provided at the sides where the opening 330 is formed. Meanwhile, the inlet duct 10 and the outlet duct 20 may have a fan to allow the cooling fluid to easily flow in and out.

A battery pack according to the present disclosure may include one or more battery modules according to the present disclosure. In addition, the battery module may include a plurality of cartridges for a battery cell according to the present disclosure. Thus, the battery pack according to the present disclosure may be regarded as including the cartridge for a battery cell according to the present disclosure. In addition, in addition to the battery module, the battery pack according to the present disclosure may further include a case for accommodating the battery module, and various devices for controlling the charging and discharging of the battery module such as a battery management system (BMS), a current sensor, a fuse or the like.

The cartridge for a battery cell according to the present disclosure may be applied to a vehicle such as an electric vehicle or a hybrid vehicle. That is, the vehicle according to the present disclosure may include the battery module according to the present disclosure, and the battery module may include the cartridge for a battery cell according to the present disclosure along with the battery cell.

The present disclosure can be substituted, modified or changed in various ways without departing from the scope of the present disclosure by those skilled in the art and thus is not limited to the above embodiments and the accompanying drawings.

What is claimed is:

1. A cartridge for battery cells, comprising:
   an upper cooling plate and a lower cooling plate having a plate shape and spaced to face each other, wherein a cooling channel is formed between the upper cooling plate and the lower cooling plate;
   a main frame surrounding an outer circumference of the upper cooling plate and an outer circumference of the lower cooling plate, wherein the main frame is configured to receive the battery cells on an upper portion and a lower portion of the main frame; and a support portion disposed at the cooling channel, the support portion including:
at least one support bar having a bar shape elongated in the flow direction of the cooling channel; and
at least one support rib protruding from the at least one support bar in an upper direction and a lower direction to support the upper cooling plate and the lower cooling plate,
wherein a length of the support rib in the flow direction of the cooling channel is less than a length of the at least one support bar in the flow direction of the cooling channel, and
wherein the at least one support rib is configured to distribute swelling and gas generated in a battery cell to a sealing portion of the battery cell, and
wherein the at least one support rib is provided in plurality in the flow direction of the cooling channel,
wherein a vertical length of one support rib of the plurality of support ribs is different from a vertical length of at least one other support rib of the plurality of support ribs,
wherein the plurality of support ribs are formed to at least one of a front end, a center portion and a rear end of the cooling channel in the flow direction of the cooling channel, and
wherein the vertical length of the support rib formed at the center portion is longer than the vertical lengths of the support ribs formed at the front end and the rear end.

2. The cartridge for battery cells according to claim 1, wherein the vertical length of one support rib of the plurality of support ribs between an upper surface and a lower surface of the at least one support rib is equal to or greater than a minimum spacing distance between the upper cooling plate and the lower cooling plate.

3. The cartridge for battery cells according to claim 1, wherein the one support rib of the plurality of support ribs is formed at the center portion of the cooling channel in the flow direction of the cooling channel.

4. A cartridge for battery cells, comprising:
an upper cooling plate and a lower cooling plate having a plate shape and spaced to face each other, wherein a cooling channel is formed between the upper cooling plate and the lower cooling plate;
a main frame surrounding an outer circumference of the upper cooling plate and an outer circumference of the lower cooling plate, wherein the main frame is configured to receive the battery cells on an upper portion and a lower portion of the main frame; and
a support portion disposed at the cooling channel, the support portion including:
at least one support bar having a bar shape elongated in the flow direction of the cooling channel; and
at least one support rib protruding from the at least one support bar in an upper direction and a lower direction to support the upper cooling plate and the lower cooling plate,
wherein the at least one support rib includes coupling protrusions formed to protrude from an upper surface of the at least one support rib that supports the upper cooling plate and a lower surface of the at least one support rib that supports the lower cooling plate,
wherein the upper cooling plate and the lower cooling plate have recessed coupling grooves respectively formed at respective inner surfaces, and
wherein the coupling protrusions are inserted and coupled in the recessed coupling grooves of the upper cooling plate and the lower cooling plate such that the coupling protrusions do not extend through the upper cooling plate and the lower cooling plate.

5. The cartridge for battery cells according to claim 1, wherein the upper cooling plate and the lower cooling plate are inclined and correspond to the vertical length of the one support rib of the plurality of support ribs between an upper surface and a lower surface of the one support rib of the plurality of support ribs.

6. The cartridge for battery cells according to claim 1, wherein the upper cooling plate has an upper surface making surface contact with a first battery cell among the battery cells, and
wherein the lower cooling plate has a lower surface making surface contact with a second battery cell among the battery cells.

7. A battery module comprising a cartridge for battery cells according to claim 1.

8. A battery pack comprising a cartridge for battery cells according to claim 1.

9. A vehicle comprising a cartridge for battery cells according to claim 1.

10. A cartridge for battery cells, comprising:
an upper cooling plate and a lower cooling plate having a plate shape and spaced to face each other, wherein a cooling channel is formed between the upper cooling plate and the lower cooling plate;
a main frame surrounding an outer circumference of the upper cooling plate and an outer circumference of the lower cooling plate, wherein the main frame is configured to receive the battery cells on an upper portion and a lower portion of the main frame; and
a support portion disposed at the cooling channel, the support portion including:
at least one support bar having a bar shape elongated in the flow direction of the cooling channel; and
at least one support rib protruding from the at least one support bar in an upper direction and a lower direction to support the upper cooling plate and the lower cooling plate,
wherein the at least one support rib is provided as a plurality of support ribs spaced along the flow direction of the at least one support bar such that an upper surface of the at least one support bar is spaced from a lower surface of the upper cooling plate thereby providing gaps for coolant to flow across the upper surface of the at least one support bar, and
wherein a vertical length of one support rib of the plurality of support ribs is different from a vertical length of at least one other support rib of the plurality of support ribs,
wherein the plurality of support ribs are formed to at least one of a front end, a center portion and a rear end of the cooling channel in the flow direction of the cooling channel, and
wherein the vertical length of the support rib formed at the center portion is longer than the vertical lengths of the support ribs formed at the front end and the rear end.

* * * * *